(12) United States Patent
Yi et al.

(10) Patent No.: US 8,897,204 B2
(45) Date of Patent: Nov. 25, 2014

(54) METHOD OF PERFORMING A COMMUNICATION IN A WIRELESS COMMUNICATION SYSTEM AND AN APPARATUS FOR THE SAME

(75) Inventors: Seung June Yi, Anyang-si (KR); Sung Duck Chun, Anyang-si (KR); Sung Hoon Jung, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 117 days.

(21) Appl. No.: 13/576,331

(22) PCT Filed: Mar. 24, 2011

(86) PCT No.: PCT/KR2011/002035
§ 371 (c)(1),
(2), (4) Date: Jul. 31, 2012

(87) PCT Pub. No.: WO2011/118996
PCT Pub. Date: Sep. 29, 2011

(65) Prior Publication Data
US 2012/0300696 A1 Nov. 29, 2012

Related U.S. Application Data

(60) Provisional application No. 61/317,711, filed on Mar. 26, 2010.

(30) Foreign Application Priority Data

Mar. 4, 2011 (KR) .......................... 10-2011-0019327

(51) Int. Cl.
*H04J 3/08* (2006.01)
*H04W 4/00* (2009.01)
*H04B 7/212* (2006.01)

(52) U.S. Cl.
USPC ............................ 370/315; 370/329; 370/337

(58) Field of Classification Search
USPC ................. 370/203–210, 315–329, 337–344; 709/236–244
See application file for complete search history.

(56) References Cited

U.S. PATENT DOCUMENTS 7,966,033 B2 * 6/2011 Borran et al. .................. 455/522
8,031,583 B2 * 10/2011 Classon et al. ................ 370/208

(Continued)

FOREIGN PATENT DOCUMENTS

WO WO 2009/126586 A2 10/2009

OTHER PUBLICATIONS

Fujitsu, "Discussion on Backhaul link of Type-1 Relay for LTE-A TDD," 3GPP TSG-RAN1 #56Bis, R1-091506 Mar. 23-27, 2009, pp. 1-5.

*Primary Examiner* — Man Phan
(74) *Attorney, Agent, or Firm* — Birch, Stewart, Kolasch & Birch, LLP (57) ABSTRACT

A method of communicating with a first network node by an user equipment (UE) in a wireless communication system using three types of subframes is disclosed. The present invention comprises receiving information on the three types of subframes from the first network node; communicating with the first network node on a first type subframe, wherein a transmission of signals in a second network node is restricted; and communicating with the first network node on a second type subframe, wherein the transmission of signals in the second network node is not restricted, wherein no communication is performed with the first network node on a third type subframe.

12 Claims, 9 Drawing Sheets

(56) References Cited

U.S. PATENT DOCUMENTS

| | | |
|---|---|---|
| 8,483,137 B2 * | 7/2013 | Lim et al. ............... 370/328 |
| 2007/0058595 A1 * | 3/2007 | Classon et al. ........... 370/337 |
| 2007/0064669 A1 | 3/2007 | Classon et al. |
| 2009/0040974 A1 * | 2/2009 | Goldhamer ............. 370/329 |
| 2009/0252077 A1 * | 10/2009 | Khandekar et al. ........ 370/312 |
| 2011/0235582 A1 * | 9/2011 | Chen et al. ............. 370/328 |
| 2011/0235584 A1 * | 9/2011 | Chen et al. ............. 370/328 |
| 2011/0235602 A1 * | 9/2011 | Ji et al. ................. 370/329 |
| 2011/0274081 A1 * | 11/2011 | Chun et al. .............. 370/330 |
| 2012/0127898 A1 * | 5/2012 | Lim et al. ............... 370/281 |
| 2013/0010741 A1 * | 1/2013 | Dai et al. ............... 370/329 |

* cited by examiner

METHOD OF PERFORMING A COMMUNICATION IN A WIRELESS COMMUNICATION SYSTEM AND AN APPARATUS FOR THE SAME

This application is the National Phase of PCT/KR2011/002035 filed on Mar. 24, 2011, which claims priority under 35 U.S.C. 119(e) to the U.S. Provisional Application No. 61/317,711 filed on Mar. 26, 2010 and under 35 U.S.C. 119(a) to Patent Application No. 10-2011-0019327 filed in the Republic of Korea on Mar. 4, 2011, all which are hereby expressly incorporated by reference into the present application.

TECHNICAL FIELD

The present invention relates to a method of performing a communication in a wireless communication system and an apparatus for the same.

BACKGROUND ART

Wireless communication systems are evolving extensively in order to provide diverse types of communication services, such as audio and video data, and so on. Generally, a wireless communication system corresponds to a multiple access system that shares available system resource (e.g., bandwidth, transmission power, and so on) so as to be capable of supporting communication between multiple users. Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi carrier frequency division multiple access (MC-FDMA) system, and so on.

DISCLOSURE OF INVENTION

Technical Problem

An object of the present invention is to provide a method of performing a communication in a wireless communication system and an apparatus for the same and, more specifically, to provide a method of performing a communication through multiple types of subframes and an apparatus for the same.

Additional objects and features of the present application will be set forth in part in the description which follows and in part will become apparent to those having ordinary skill in the art upon examination of the following or may be learned from practice of the present application.

Solution to Problem

To achieve these objects and other advantages and in accordance with the purpose of the invention, as embodied and broadly described herein, according to an embodiment of the present invention, a method of communicating with a first network node by an user equipment (UE) in a wireless communication system using three types of subframes, provided herein is the method which includes the steps of receiving information on the three types of subframes from the first network node, communicating with the first network node on a first type subframe, wherein a transmission of signals in second network node is restricted, and communicating with the first network node on a second type subframe, wherein the transmission of signals in the second network node is not restricted, and wherein no communication is performed with the first network node on a third type subframe.

Also, provided herein is the method of communicating with the first network node, wherein the three types of subframes may be classified by an interference level on an intensity of interference.

Also, provided herein is the method of communicating with a first network node, wherein the interference is caused by the transmission of signals in the second network node while communicating with the first network node.

Also, provided herein is the method of communicating with a first network node, wherein the first type subframe has a first interference level, the third type subframe has a third interference level which is different from the first interference level, and the second type subframe has a second interference level ranging between the first interference level and the third interference level.

Also, provided herein is the method of communicating with a first network node, wherein the first interference level has a higher intensity of interference than the third interference level.

Also, provided herein is the method of communicating with a first network node, wherein the first network node is a relay node (RN), and the second network node is a donor eNB (DeNB).

Also, provided herein is the method of communicating with a first network node, wherein the first type subframe is an unicast subframe, the second type subframe is a contention based subframe, and the third type subframe is a relay node (RN) subframe.

To achieve these objects and other advantages and in accordance with the purpose of the invention, as embodied and broadly described herein, according to another embodiment of the present invention, a method of communicating with an user equipment (UE) by a first network node in a wireless communication system using three types of subframes, provided herein is the method which includes the steps of receiving information on the three types of subframes from a second network node, communicating with the user equipment (UE) on a first type subframe, wherein a transmission of signals in the second network node is restricted, and communicating with the user equipment (UE) on a second type subframe, wherein the transmission of signals in the second network node is not restricted, and wherein no communication is performed with the user equipment on a third type subframe.

Also, provided herein is the method of communicating with the user equipment (UE), wherein a reception of signals from the second network node is not attempted while communicating with the user equipment (UE) on the second type subframe.

Also, provided herein is the method of communicating with the user equipment (UE), wherein the first network node is a relay node (RN), and the second network node is a donor eNB (DeNB).

Also, provided herein is the method of communicating with the user equipment (UE), wherein the first type subframe is an unicast subframe, the second type subframe is a contention based subframe, and the third type subframe is a RN subframe.

To achieve these objects and other advantages and in accordance with the purpose of the invention, as embodied and broadly described herein, according to yet another embodiment of the present invention, a method of communicating with a first network node by a second network node in a wireless communication system using three types of subframes, the method which includes the steps of transmitting information on the three types of subframes to the first network node, communicating with the first network node on a first type subframe, wherein a transmission of signals in an user equipment (UE) is restricted, and communicating with the first network node on a second type subframe, wherein the transmission of signals in the user equipment (UE) is not restricted, and wherein no communication is performed with the first network node on a third type subframe.

Also, provided herein is the method of communicating with the first network node, wherein the three types of subframes may be classified by an interference level on an intensity of interference.

Also, provided herein is the method of communicating with the first network node, wherein the interference is caused by the transmission of signals in the user equipment (UE), while communicating with the first network node.

Also, provided herein is the method of communicating with the first network node, wherein the first type subframe has a first interference level, the third type subframe has a third interference level which is different from the first interference level, and the second type subframe has a second interference level ranging between the first interference level and the third interference level.

Also, provided herein is the method of communicating with the first network node, wherein the first interference level has a higher intensity of interference than the third interference level.

Also, provided herein is the method of communicating with the first network node, wherein the first network node is a relay node (RN), and the second network node is a donor eNB (DeNB).

Also, provided herein is the method of communicating with the first network node, wherein the first type subframe is an unicast subframe, the second type subframe is a contention based subframe, and the third type subframe is a RN subframe.

Advantageous Effects of Invention

According to the embodiment of the present invention, radio resources may be efficiently used, and signals or messages may be easily transmitted and received in accordance with the radio environment.

Additional advantages of the present application will be set forth in part in the description which follows and in part will become apparent to those having ordinary skill in the art upon examination of the following or may be learned from practice of the present application.

BEST MODE FOR CARRYING OUT THE INVENTION

Reference will now be made in detail to the preferred embodiments of the present invention, examples of which are illustrated in the accompanying drawings. The detailed description of the present invention that will be disclosed hereinafter is intended to provide a description of an exemplary embodiment of the present invention. Therefore, it will be apparent that the following description does not represent the only embodiment that can be realized and carried out according to the present invention. For example, the present invention will be described as follows provided that a 3GPP LTE based system will be given as an example of the wireless communication system according to the present invention. However, the present invention may also be applied in diverse types of wireless communication systems, such as an IEEE 802.16 based system.

First of all, as an example of a wireless communication system wherein the present invention is applied, the 3GPP LTE system will be described in detail.

Figure 1:
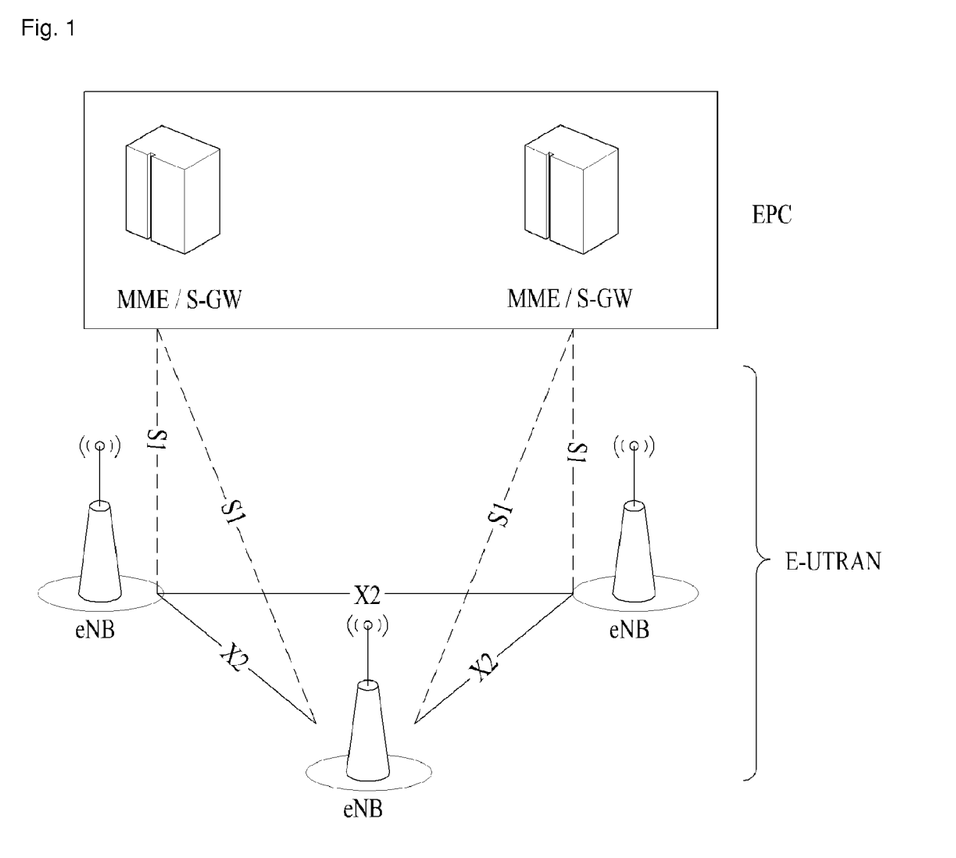
FIG. 1 illustrates an exemplary structure of an Evolved Universal Mobile Telecommunication System (E-UMTS).

FIG. 1 illustrates an exemplary structure of an E-UMTS (Evolved Universal Mobile Telecommunication System). The E-UMTS corresponds to an evolved version of the conventional UMTS, and the standardization procedure for the E-UMTS is currently under process in the 3GPP system. The E-UMTS is also referred to as a LTE (Long Term Evolution) system. The E-UMTS may be classified as an E-UTRAN (Evolved Terrestrial Radio Access Network) and an EPC (Evolved Packet Core).

The E-UTRAN may be configured of a base station (or evolved-NodeB (hereinafter referred to as 'eNB') and an user equipment (hereinafter referred to as 'UE'). And, each eNB is connected to one another via wired connection over an X2 interface. And, the eNB is connected to a UE via wireless connection over an Uu interface. The EPC is configured of an MME (Mobility Management Entity), which performs the function of a Control Plane, an S-GW (Serving-Gateway) and a PDN-GW (Packet Data Network-Gateway), which performs the function of a User Plane. The MME carries access information of the UE or information on the capability of the UE. Such information is mainly used for managing the mobility of the UE. The S-GW corresponds to a gateway having the E-UTRAN as its end-point, and the PDN-GW corresponds to a gateway having the PDN as its end-point.

A control message being exchanged by eNBs over the X2 interface uses an X2 Application Part (X2AP) protocol and is referred to as an X2AP message. Also, a control message being exchanged by the MME and the eNB over the S1 interface uses an S1 Application Part (S1AP) protocol and is referred to as an S1AP message.

A Radio Interface Protocol is used as the Uu interface. The Radio Interface Protocol may be divided into L1 (a first layer) including a physical layer, L2 (a second layer) including a MAC/RLC/PDCP layer, and L3 (a third layer) including an RRC layer, based upon 3 lower layers of an Open System Interconnection (OSI) reference model, which is widely known in the communication system.

Meanwhile, when using a technique for relaying data between the eNB and the UE, since a smooth communication cannot be realized if the distance between the eNB and the UE is too far, a relay process has been adopted in order to complement such disadvantage. In order to perform the above-described relay process, a new wireless device, which is referred to as a relay node (hereinafter referred to as 'RN') is provided between the eNB and the UE. Herein, the eNB that manages the RN is particularly referred to as a Donor eNB (hereinafter referred to as a 'DeNB'). Also, an interface between the DeNB and the RN is defined as a Un interface, thereby differentiating the Un interface from the Uu interface. Hereinafter, the RN and the Un interface will be briefly described with reference to FIG. 2.

Figure 2:
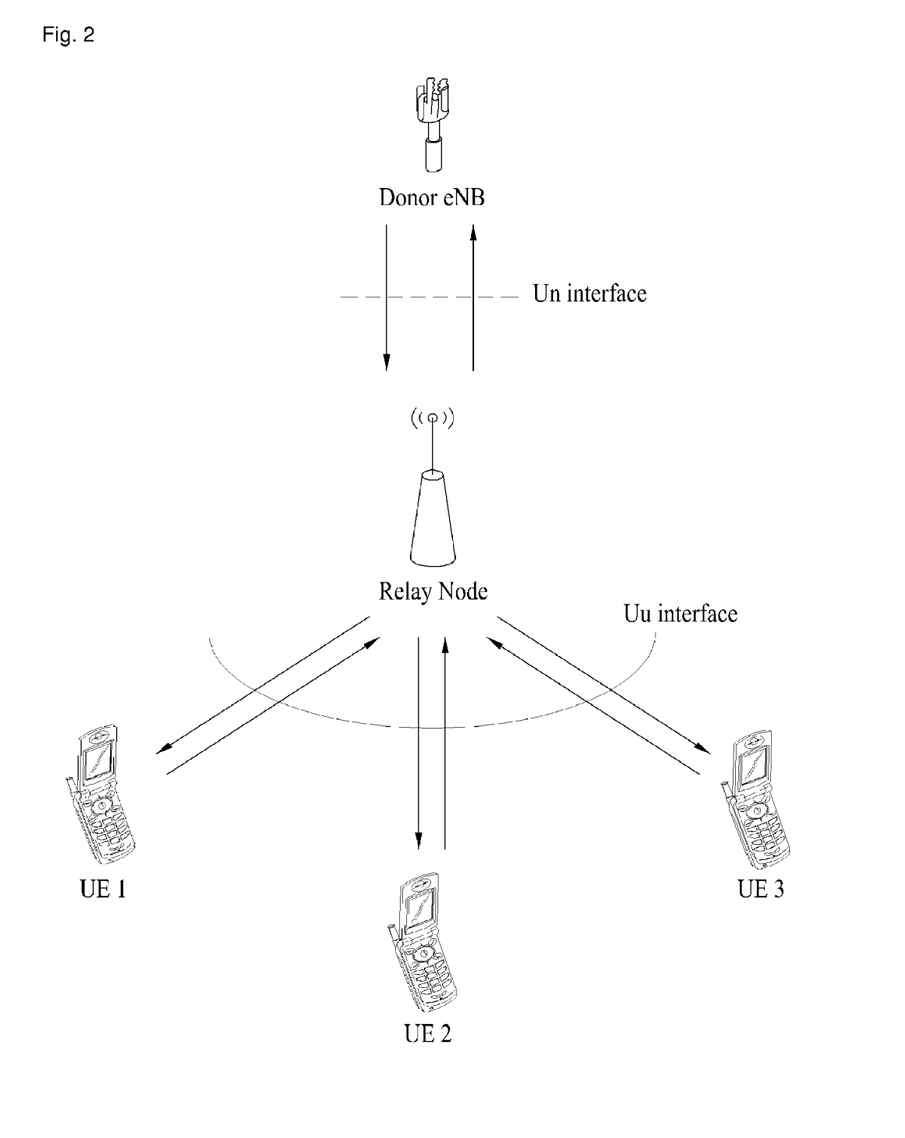
FIG. 2 illustrates a relay node (RN), an Un interface, and an Uu interface in which the present invention is applied.

FIG. 2 illustrates a relay node (RN), an Un interface, and an Uu interface in which the present invention is applied. Referring to FIG. 2, the RN may perform the role of managing the UE instead of the DeNB. More specifically, in the perspective of the UE, the RN may be recognized as the eNB. Therefore, the Uu interface between the eNB and the UE is applied between the RN and the UE, and the MAC/RLC/PDCP/RRC, which corresponds to the radio interface protocol, is applied without any modification.

Depending upon the circumstances, in the perspective of the DeNB, the RN may be recognized as the UE or as the eNB. More specifically, when the RN first accesses the DeNB, since the DeNB is incapable of recognizing the existence of the RN, the RN performs a random access, which is similar to the UE. Then, after accessing the DeNB, the RN operates as the eNB, which manages the UE connected to the RN itself. Therefore, the Un interface uses the Uu interface protocol, which is used when the RN operates as the UE, and also uses the X2AP (X2 Application Part) protocol and the S1AP (S1 Application Part) protocol, which are used when the RN operates as the eNB.

Meanwhile, when the RN communicates with the UE, the RN may share a frequency band that is used by the DeNB for communicating with the RN. When the Un interface and the Uu interface uses the same frequency band, this operation is referred to as an in-band operation. When the RN performs an in-band operation, a problem of self-interference, which occurs during data transmission and reception in the Un interface and the Uu interface, should be resolved. For example, when the RN transmits data to the UE on a subframe, to which the DeNB transmits data to the RN, the data transmitted by the RN to the UE may be recognized as noise by a receiver of the RN. Furthermore, interference may occur between a transmitter and a receiver of the RN.

Accordingly, a Backhaul subframe may be set up as an MBSFN (Multicast Broadcast over a Single Frequency Network) in a downlink, and the Backhaul subframe may be used for backhaul partitioning of a radio frame. The RN may communicate with the DeNB only on the MBSFN subframe within the radio frame. And, the RN may communicate with the UE on the other subframes excluding the MBSFN subframe within the radio frame.

Moreover, the RN may be allocated with a Backhaul subframe from a network entity, such as the DeNB, and the RN may be set to communicate only with the DeNB on the Backhaul subframe. With the exception for the Backhaul subframe, the other subframes within the radio frame may be referred to as unicast subframes, and the RN may communicate with the UE during the unicast subframes. Meanwhile, the Backhaul subframe may also be referred to as an RN subframe. And, the term Backhaul subframe will hereinafter be referred to as the term 'RN subframe'. In the following description made with reference to FIG. 3 and FIG. 4, the structure of a downlink radio frame will be briefly described.

Figure 3:
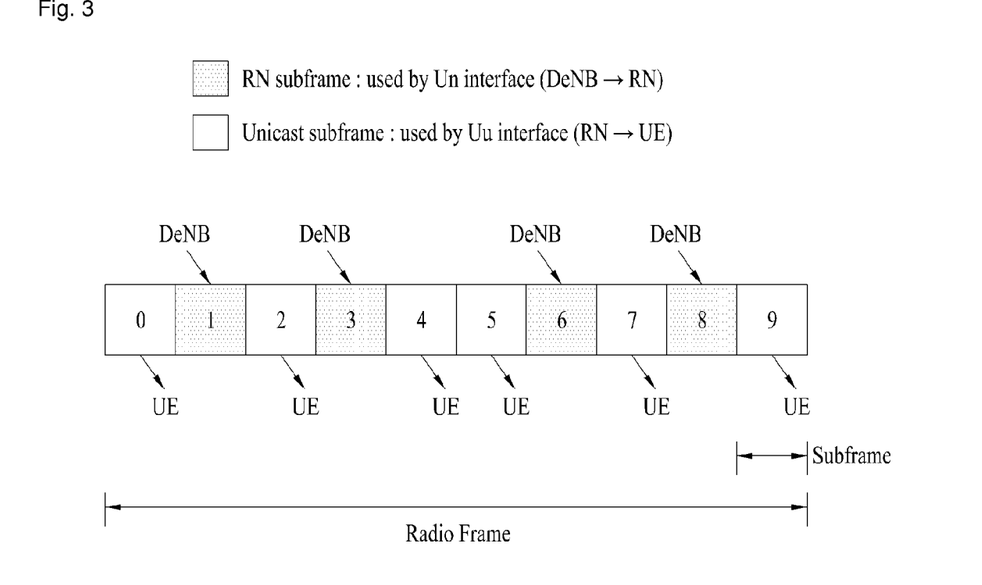
FIG. 3 and FIG. 4 illustrate a downlink radio frame structure in which the present invention is applied.

FIG. 3 and FIG. 4 illustrate a structure of a downlink radio frame in which the present invention is applied. Referring to FIG. 3, within a downlink radio frame, the RN is allocated with subframes of number 1, 3, 6, and 8 as the RN subframes. And, reception of messages from the DeNB may be attempted on the allocated RN subframes. Within the downlink radio frame, with the exception for the RN subframes, the remaining subframes of number 0, 2, 4, 5, 7, and 9 correspond to unicast subframes, on which the RN may transmit signals or messages to the UE. Furthermore, the RN subframe may be set up as MBSFN subframe.

Figure 4:
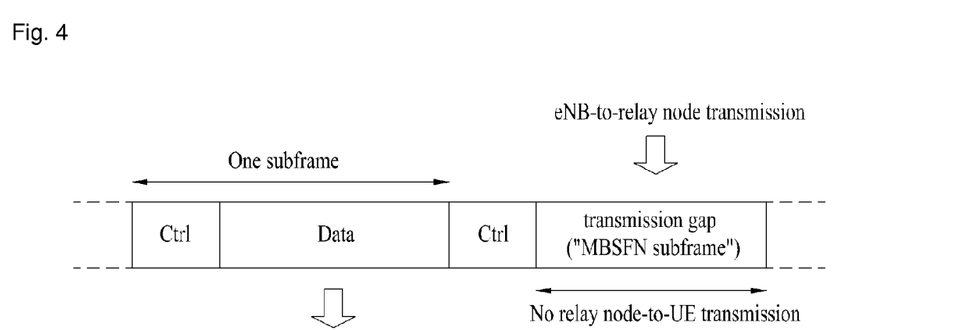

Referring to FIG. 4, the subframe positioned on the left side corresponds to an unicast subframe, and the subframe positioned on the right side corresponds to a RN subframe. FIG. 4 illustrates a structure wherein the RN subframe is set up as the MBSFN subframe. On the unicast subframe, a signal or message may be transmitted from the RN to the UE through a PDCCH (Physical Downlink Control Channel) and a PDSCH (Physical Downlink Shared Channel), and on the MBSFN subframe, a signal or a message may be transmitted from the RN to the UE through an R-PDCCH (Relay-Physical Downlink Control Channel) and an R-PDSCH (Relay-Physical Downlink Shared Channel). Hereinafter, the respective relations between the unicast subframe and MBSFN subframe and the PDCCH and R-PDCCH will be briefly described with reference to FIG. 5.

Figure 5:
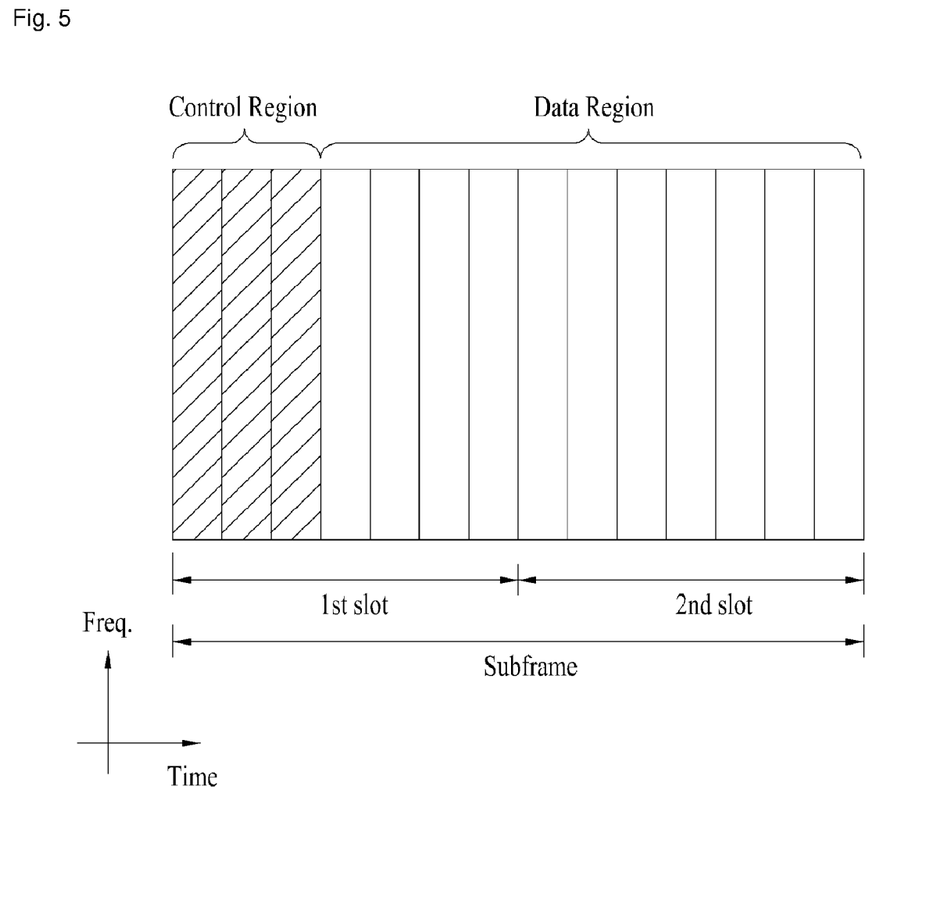
FIG. 5 illustrates a structure of an unicast subframe in which the present invention is applied.

FIG. 5 illustrates a structure of an unicast subframe in which the present invention is applied. Referring to FIG. 5, an unicast subframe may include 2 slots in the time domain. A maximum of 3 foremost OFDM symbols of a first slot within the unicast subframe collectively configure a control region, wherein the PDCCH (Physical Downlink Control Channel) is allocated thereto, and the remaining symbols collectively configure a data region, wherein a PDSCH (Physical Downlink Shared Channel) is allocated thereto. Herein, the control information being transmitted through the PDCCH is referred to as DCI (Downlink Control Information), which may include uplink resource allocation information, downlink resource allocation information, and uplink transmission power control commands on random UE groups. The PDCCH may carry and deliver transmission format information and resource allocation information of a downlink shared channel (DL-SCH), paging information within a PCH (Paging Channel), system information within the DL-SCH, resource allocation information on higher layer control messages, such as random access responses being transmitted through the PDSCH, transmission power control command sets on individual UEs within random UE groups, information on transmission power control commands, information on the activation of a VoIP (Voice of Internet Protocol), and so on. The eNB decides the PDCCH format depending upon the DCI that is to be transmitted to the UE and adds a CRC to the control information. The CRC is masked with a unique identifier (i.e., RNTI (Radio Network Temporary Identifier)) in accordance with the purpose or owner of the PDCCH. If the PDCCH is specified for a specific UE, a unique identifier (e.g., C-RNTI (Cell-RNTI)) is masked to the CRC. And, if the PDCCH is specified for a paging message, a paging indicator identifier (e.g., a P-RNTI (Paging-RNTI)) is masked to the CRC. Also, if the PDCCH is specified for the system information, a system information identifier and a system information RNTI (S-RNTI) may be masked to the CRC. Also, in order to indicate a random access response, which corresponds to a response of the UE to the reception of a random access preamble, a random access RNTI (RA-RNTI) may be masked to the CRC.

The structure of a RN subframe is not very different from the above-described structure of the unicast subframe. The RN subframe may include a control region and a data region. Depending upon the settings, the control region may be allocated to one foremost OFDM symbol section to 3 foremost OFDM symbol sections within the first slot of the RN subframe. Most particularly, in case of the MBSFN subframe, 2 OFDM symbol sections may be allocated. Also, depending upon the settings, the data region may be allocated to the entire second slot or to sections of the second slot excluding the last symbol. Herein, a R-PDCCH (Relay-Physical Downlink Control Channel) and a R-PDSCH (Relay-Physical Downlink Shared Channel) may be allocated to the data region of the MBSFN subframe. And, with the exception for the fact that the R-PDCCH corresponds to a RN-specific PDCCH, the R-PDCCH is similar to the above-described PDCCH. The R-PDCCH transmits RN-specific downlink control information (DCI). For example, the R-PDCCH may deliver RN-specific downlink scheduling information and RN-specific uplink scheduling information. The RN-specific downlink data and messages may be received through the R-PDSCH, which is indicated by the R-PDCCH.

Meanwhile, the number of RN subframes being allocated to a radio frame may be decided by taking into consideration the number of radio resources of the DeNB and the number of UEs being managed by the RN. At this point, if an excessive number of RN subframes is allocated, congestion may occur in the Uu interface. Conversely, if an insufficient number of RN frames is allocated, congestion may occur in the Un interface. Therefore, the process of deciding the number of RN subframes within a radio frame is crucial in the aspect of enabling an efficient usage of radio resource and preventing congestion from occurring within the corresponding interface. However, it is difficult to accurately estimate the number of required RN subframes before the RN performs communication. Furthermore, a reconfiguration of the required RN subframes during the communication process of the RN may lead to a signaling overhead and may also cause a time loss.

Figure 6:
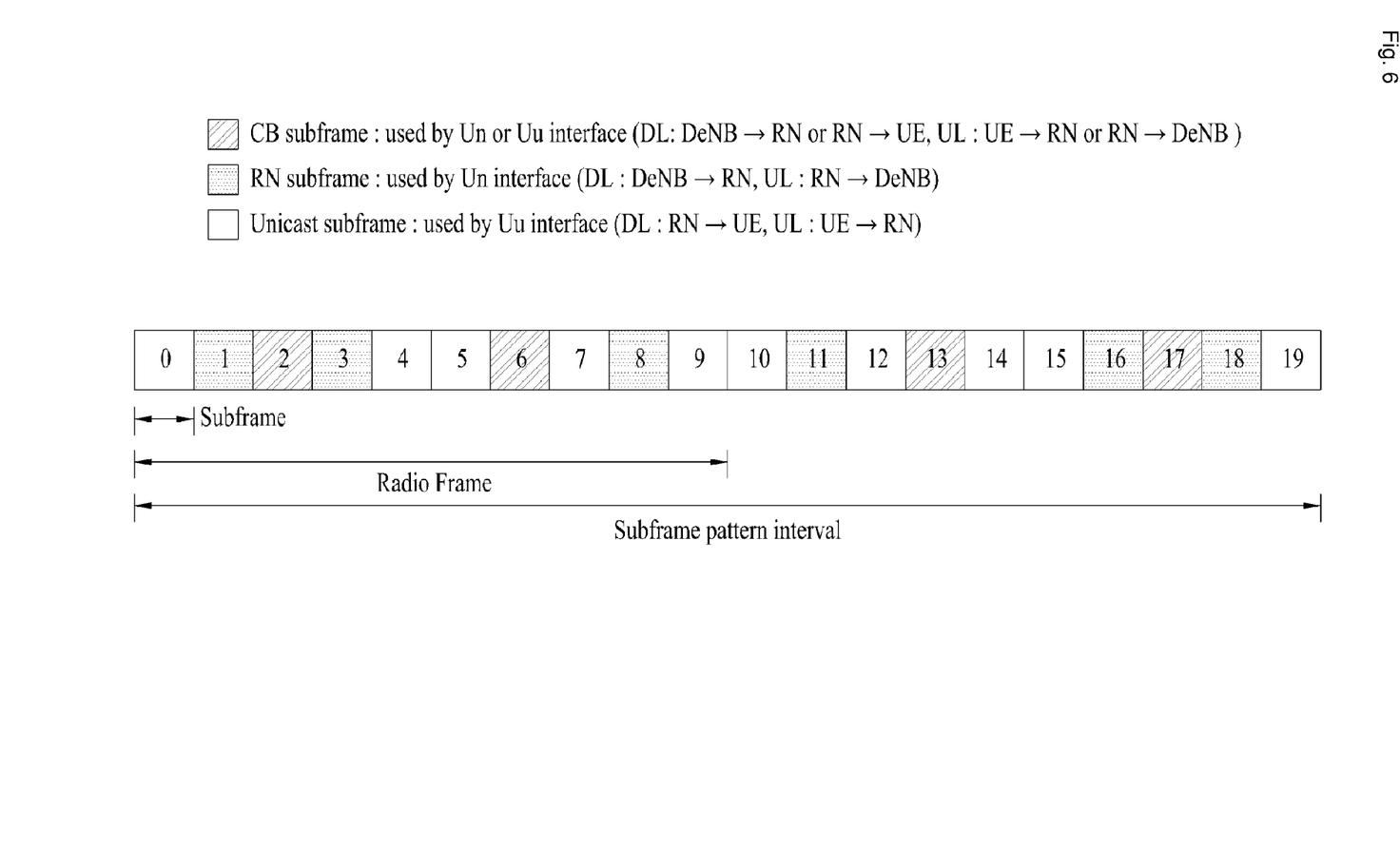
FIG. 6 illustrates a structure of a radio frame according to an embodiment of the present invention.

FIG. 6 illustrates a structure of a radio frame according to an embodiment of the present invention. Referring to FIG. 6, a radio frame may be classified into a plurality of subframe types. The plurality of subframe types may each include an unicast subframe, a RN subframe, and a contention based (CB) subframe. Depending upon the radio resource environment, the contention based subframe may variably use radio resource of the Uu interface and the Un interface. Unlike the unicast subframe and the RN subframe, on the contention based subframe, the RN may attempt to transmit signals or messages to the UE or receive signals or messages from the DeNB in case of a downlink, and the RN may attempt to transmit signals or messages to the DeNB or receive signals or messages from the UE in case of an uplink. More specifically, on the contention based subframe, depending upon its radio environment, the RN may adequately use radio resources of the Uu interface or the Un interface.

When the RN first accesses the DeNB, the RN may be allocated with RN subframes, unicast subframes, and contention based subframes from a network node such as the DeNB. Information on the three different subframe types and the subframe allocation information of each subframe type may be transmitted as an RRC message or an NAS message. The subframe allocation information may be received for each of the three subframe types: the RN subframe, the unicast subframe, and the contention based subframe. However, considering a signaling overhead, the allocation information for two of the three different subframe types may be acquired, and the remaining subframe type may be determined as a subframe type excluding the two subframe types that are allocated to a radio frame. For example, the RN may acquire only the allocation information on the RN subframes and the contention based subframes within the radio frame. And, the remaining subframes excluding the RN subframes and the contention based subframes may be determined as unicast subframes.

The allocation structure of a subframe may be configured of a periodic pattern. Therefore, the subframe allocation information may provide information on the length of a cycle period and information on a subframe position within a cycle period. The length of a cycle period may be represented as a number of consecutive radio frames or subframes or as a time respective to the number of consecutive radio frames or subframes. Furthermore, with respect to a subframe belonging to the radio frame, information on the type of the corresponding subframe may be also provided.

Referring to FIG. 6, the subframe allocation structure of a periodic pattern may be configured of two radio frames, for example, 20 subframes. Herein, the $2^{nd}$, $6^{th}$, $13^{th}$, and $17^{th}$ subframes may be allocated as the contention based subframes. The allocated contention based subframes may be repeated at a cycle period of two radio frames. The cycle period of a pattern, the position of contention based subframes, and the allocated number of contention based subframes are merely exemplary. Therefore, it will be apparent that the settings of such information may vary depending upon the radio environment and the condition of the wireless device.

In addition to the contention based subframes, RN subframes and unicast subframes may also be allocated. At this point, the cycle periods for the subframe patterns of each subframe type is identical to one another. Furthermore, as described above, even when there is no allocation information on the unicast subframes, the subframes excluding the contention based subframes and the RN subframes may be determined as the unicast subframes.

Meanwhile, in a downlink, a contention based subframe may be set up as an MBSFN subframe. More specifically, among the MBSFN subframes, some of the MBSFN subframes may be set up as the RN subframes, and the remaining MBSFN subframes may be set up as the contention based subframes. Furthermore, the remaining subframes excluding the MBSFN subframes may be set up as the unicast subframes. Conversely, it will be apparent that the MBSFN subframes may be set up as the RN subframes, and that, among the remaining subframes excluding the MBSFN subframes, some may be set up as the contention based subframes, and the remaining subframes may be set up as the unicast subframes.

Figure 7:
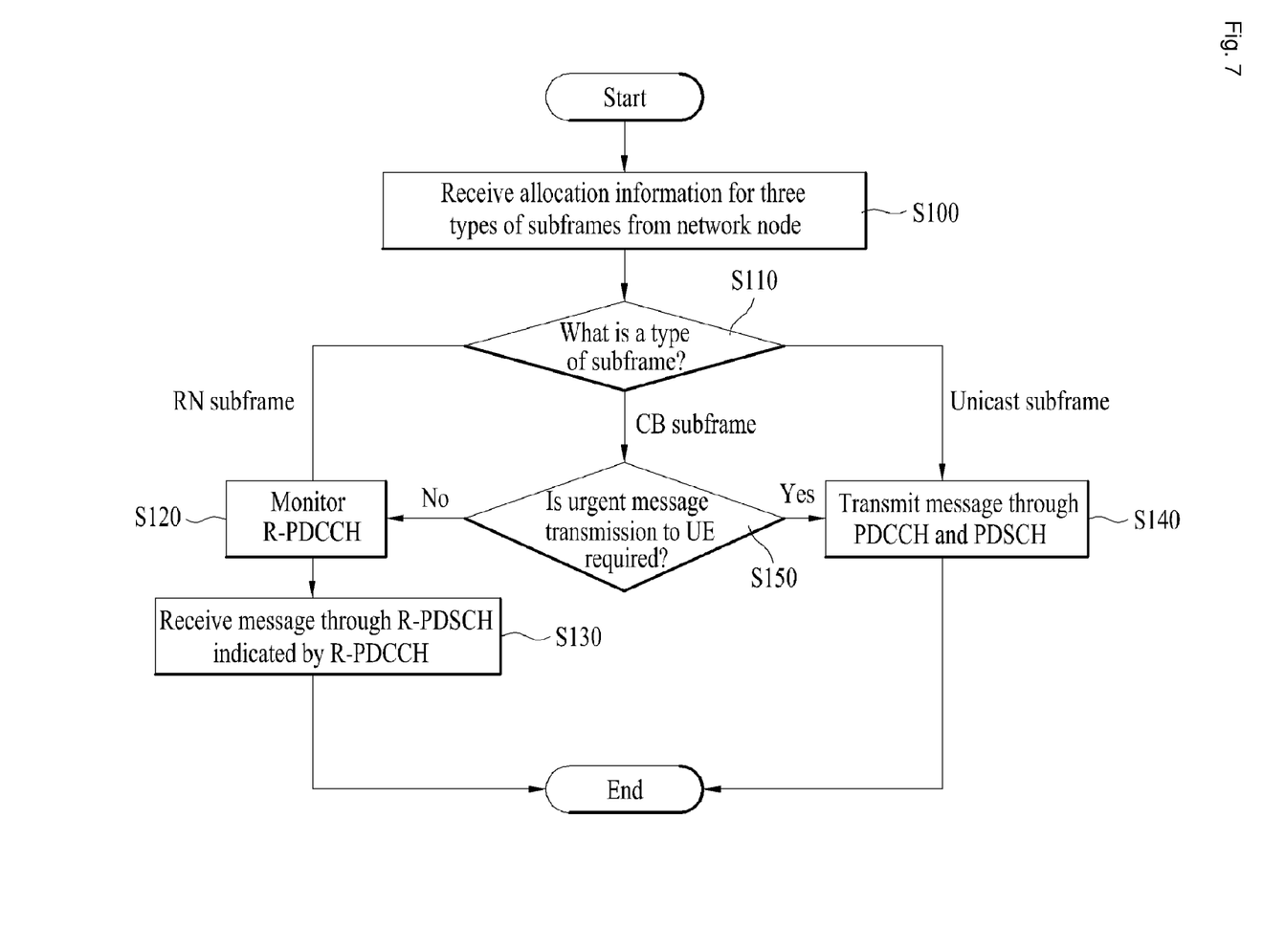
FIG. 7 illustrates a method for transmitting and receiving downlink signals according to an embodiment of the present invention.

FIG. 7 illustrates a method for transmitting and receiving downlink signals according to an embodiment of the present invention. Referring to FIG. 7, the RN may receive allocation information for three types of subframes, i.e., unicast subframes, RN subframes, and contention based (CB) subframes, from a network node, such as the DeNB (S100). The transmission and reception of signals or messages in the RN may be identified depending upon the subframe type at a corresponding time point (S110).

The RN may monitor an R-PDCCH (Relay-Physical Downlink Control Channel) that is transmitted from the DeNB on the RN subframe (S120). When an R-PDCCH having a unique identifier of the RN (e.g., a C-RNTI (Cell-RNTI)) is detected, a signal or an associated message may be received through an R-PDSCH (Relay-Physical Downlink Shared Channel), which is indicated by control information received through the R-PDCCH (S130). Meanwhile, since there are no signals or messages being transmitted from the DeNB on an unicast subframe, the monitoring of the R-PDCCH may be stopped. If there are signals or messages that are to be transmitted to the UE, the signals or messages may be transmitted through a PDCCH (Physical Downlink Control Channel) and a PDSCH (Physical Downlink Shared Channel) (S140).

On the contention based subframe, the RN may transmit signals or messages to the UE through the PDCCH and the PDSCH depending upon its radio environment, or the RN may monitor the R-PDCCH from the DeNB (S150). If the radio resource provided by the unicast subframes is insufficient, due to an excessive number of signals or messages that are to be transmitted from the RN to the UE, the RN may use the contention based subframes as the unicast subframes so as to transmit signals or messages to the UE (S140). Alternatively, if the radio resource provided only by the unicast subframes is sufficient, due to a small number of signals or messages that are to be transmitted from the RN to the UE, the RN may use the contention based subframes as the RN subframes, so as to perform monitoring of the R-PDCCH from the DeNB (S120). More specifically, the RN may use the contention based subframes and the RN subframes. Then, in an exceptional situation, such as when a transmission of signals or messages to the UE is urgently required to be performed, the contention based subframes may be used as the unicast subframes. Meanwhile, it is apparent that in a contrary situation, i.e., the contention based subframes may be normally used as unicast subframes, and then used as the contention based subframes in particular situations.

When the RN transmits signals or messages to the UE on a contention based subframe, the monitoring of the R-PDCCH from the DeNB is not performed. Therefore, while the RN transmits the signals or messages to the UE on a contention based subframe, if the DeNB transmits signals or messages to the RN on the same contention based subframe, since the RN does not attempt to receive the signals or messages from the DeNB, the signals or messages transmitted from the DeNB may be lost. Therefore, when the DeNB transmits signals or messages to the RN on a contention based subframe, the DeNB may transmit messages or signals that have a relatively lower importance level, and that are tolerated to be lost or capable of being retransmitted.

Figure 8:
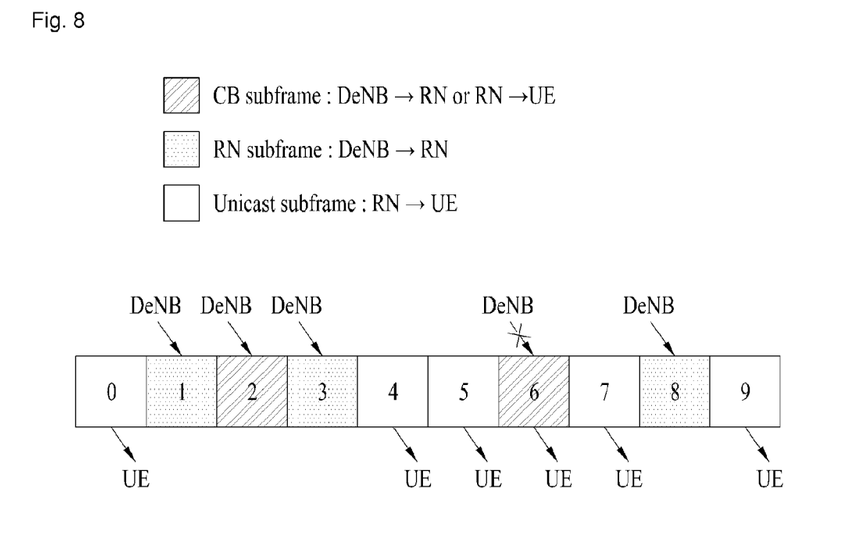
FIG. 8 illustrates a transmission and reception structure of a downlink signal or a downlink message via a contention based subframe according to an embodiment of the present invention.

FIG. 8 illustrates a transmission and reception structure of a downlink signal or a downlink message on a contention based subframe, according to an embodiment of the present invention.

RN may receive information on the subframe allocation structure of a periodic pattern from a network node, such as the DeNB. According to the embodiment of the present invention, the cycle period of a pattern will be determined as a radio frame. Contention based subframes are allocated to subframes of number 2 and number 6, RN subframes are allocated to subframes of number 1, number 3, and number 8, and the unicast subframes are allocated to subframes of number 0, number 4, number 5, number 7, and number 9. In order to receive signals or messages from the DeNB on subframes of number 2 and number 6, which correspond to the contention based subframes, the RN may monitor the R-PDCCH. At this point, in case signals or messages are required to be transmitted to the UE, the monitoring of the R-PDCCH may be stopped, and the signals or messages are transmitted to the UE on the corresponding contention based subframe. Referring to FIG. 8, among the contention based subframes, subframe of number 2 attempts to receive signals or messages from the DeNB, and, among the contention based subframes, subframe of number 6 stops the attempt to receive the signals or messages from the DeNB and transmits signals or messages to the UE on subframe of number 6.

Meanwhile, in case the transmission of signals or messages from the DeNB and the transmission of signals or messages in the RN occur on the same contention based subframe at the same time, in the perspective of the UE, the intensity of the reception noise or interference may be increased. This is because, when the RN transmits signals or messages to the UE on the contention based subframe, the RN does not attempt to receive the signals or messages transmitted from the DeNB. Therefore, when the RN transmits signals or messages to the UE on the contention based subframe, the RN is required to adopt a method of increasing a transmission power or decreasing a modulation level as compared to when transmitting signals or messages to the UE on an unicast subframe.

Furthermore, just as in the unicast subframe, in order to receive signals or messages from the RN on a contention based subframe, the UE may monitor the PDCCH. At this point, as described above, since a transmission of signals or messages also occurs from the DeNB on the contention based subframe, the intensity of the reception noise or interference may increase as compared to the unicast subframe. Therefore, it is required to increase the reception sensitivity. Hereinafter, a method for identifying subframes based upon the intensity of the reception noise or interference will be briefly described with reference to FIG. 9.

Figure 9:
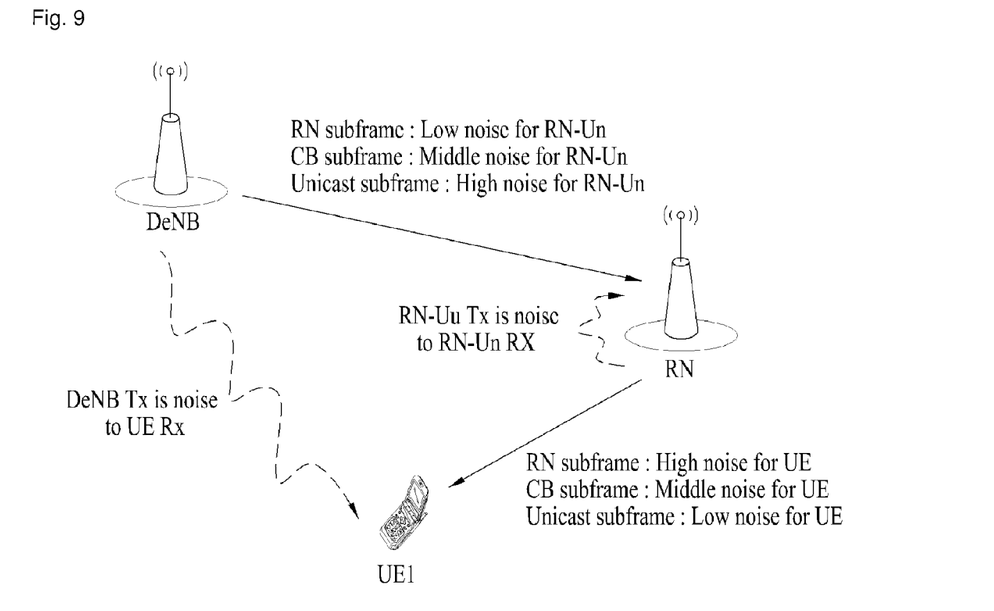
FIG. 9 illustrates a method for identifying a downlink subframe based upon an intensity of a reception noise or interference according to an embodiment of the present invention.

FIG. 9 illustrates a method for identifying a downlink subframe based upon an intensity of a reception noise or interference according to an embodiment of the present invention. With respect to the UE, the RN subframes, the contention based subframes, and the unicast subframes may be identified by the intensity of a reception noise or interference. When the reception target is the signals or messages transmitted from the RN, a reception noise or interference may occur due to a transmission of signals or messages from the DeNB to the RN. Since the DeNB may transmit signals or messages to the RN with a higher probability on the RN subframe, the intensity of the reception noise or interference is the highest. And, since the DeNB transmits signals or messages to the RN with a lower probability on the contention based subframe, the intensity of the reception noise or interference is of a middle level. And, since the DeNB does not transmit any signals or messages to the RN on the unicast subframe, the intensity of the reception noise or interference is the lowest. Therefore, when the UE receives the signals or messages from the RN or performs a measurement of the radio environment, the reception or measurement process may be performed while taking into consideration the intensity of the reception noise or interference on the subframe.

In the aspect of a reception in the RN over an Un interface, when the reception target is the signals or messages transmitted from the DeNB, a reception noise or interference may occur due to a transmission of signals or messages from the RN to the UE. Since the RN does not transmit any signals or messages to the UE on the RN subframe, the intensity of the reception noise or interference is the lowest. And, since the RN transmits signals or messages to the UE with a lower probability on the contention based subframe, the intensity of the reception noise or interference is of a middle level. And, since the RN may transmit signals or messages to the UE with a higher probability on the unicast subframe, the intensity of the reception noise or interference is the highest. Therefore, when the RN receives the signals or messages from the DeNB or performs a measurement of the radio environment, the reception or measurement process may be performed while taking into consideration the intensity of the reception noise or interference on the subframe. Meanwhile, in case of a downlink, it can be apparent that, in the receiving aspect of the RN or the UE, the reception noise or interference intensity level on a contention based subframe has a middle level as compared to those of the RN subframe and the Unicast subframe.

The method for transmitting and receiving signals on a contention based subframe in an uplink is not largely different from the basic concept of the above-described method for transmitting and receiving signals on a contention based subframe in a downlink. The RN may transmit signals or messages to the DeNB on the RN subframe, and the RN may receive signals or messages from the UE on the unicast subframe. On the Contention Based subframe, depending upon its radio environment, the RN may either receive signals or messages from the UE or transmit signals or messages to the DeNB. More specifically, the RN uses the contention based subframe as the unicast subframe, so as to be on stand-by for receiving the signals or messages. Then, in an exceptional situation, such as when signals or messages is urgently required to be transmitted to the DeNB, the contention based subframe may be used as the RN subframe. Meanwhile, it is apparent that in a contrary situation, i.e., the contention based subframes may be normally used as RN subframes, and then used as the unicast subframes in exceptional situations.

When the RN transmits signals or messages to the DeNB on a contention based subframe, the signals or messages transmitted from the UE may be lost. Therefore, when the UE transmits signals or messages to the RN on a contention based subframe, the UE may transmit messages or signals that have relatively lower importance level, and that are tolerated to be lost or capable of being retransmitted.

Meanwhile, in case the transmission of signals or messages from of the RN and the transmission of signals or messages of the UE occur on the same contention based subframe at the same time, in the perspective of the DeNB, the intensity of the reception noise or interference may be increased. Therefore, when the RN transmits signals or messages to the DeNB on the contention based subframe, the RN is required to adopt a method of increasing a transmission power or decreasing a modulation level as compared to when transmitting signals or messages to the DeNB on a RN subframe. Furthermore, the DeNB recognizes that the intensity of the reception noise or interference may be increased on the contention based subframe, as compared to the RN subframe. Therefore, it is required to increase the reception sensitivity.

Figure 10:
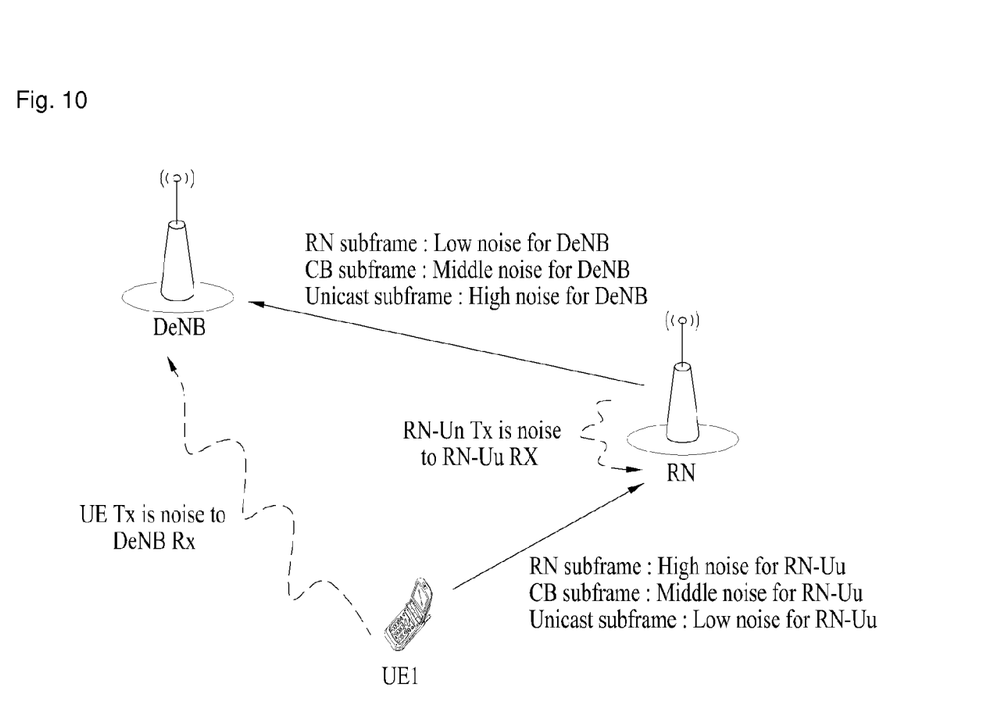
FIG. 10 illustrates a method for identifying an uplink subframe based upon an intensity of a reception noise or interference according to an embodiment of the present invention.

FIG. 10 illustrates a method for identifying an uplink subframe based upon an intensity of a reception noise or interference according to an embodiment of the present invention. With respect to the DeNB, the RN subframes, the contention based subframes, and the unicast subframes may be identified by the intensity of reception noise or interference. When the reception target is the signals or messages transmitted from the RN, a reception noise or interference may occur because the UE transmits signals or messages to the RN. Since the UE does not transmit any signals or messages to the RN on the RN subframe, the intensity of the reception noise or interference is the lowest. And, since the UE transmits signals or messages to the RN with a lower probability on the contention based subframe, the intensity of the reception noise or interference is of a middle level. And, since the UE transmits signals or messages to the RN with a higher probability on the unicast subframe, the intensity of the reception noise or interference is the highest. Therefore, when the DeNB receives the signals or messages from the RN or performs a measurement of the radio environment, the reception or measurement process may be performed while taking into consideration the intensity of the reception noise or interference on the subframe.

With respect to the aspect of a reception in the RN over an Uu interface, the reception target is the signals or messages transmitted from the UE, and the reception noise or interference may occur due to signals or messages transmission from the RN to the DeNB. Since the RN transmits signals or messages to the DeNB with a higher probability on the RN subframe, the intensity of the reception noise or interference is the highest. And, since the RN transmits signals or messages to the DeNB with a lower probability on the contention based subframe, the intensity of the reception noise or interference is of a middle level. And, since the RN does not transmit any signals or messages to the DeNB on the unicast subframe, the intensity of the reception noise or interference is the lowest. Therefore, when the RN receives the signals or messages from the UE or performs a measurement of the radio environment, the reception or measurement process may be performed while taking into consideration the intensity of the reception noise or interference during the subframe. In case of an uplink, just as in the downlink, it can be apparent that, in the receiving aspect of the DeNB or the RN, a reception noise or interference intensity level on the contention based subframe has a middle level as compared to those of the RN subframe and the unicast subframe.

Meanwhile, the intensity of the reception noise or interference respective to the above-described subframe types may be standardized to a specific range. A first range that an intensity of a reception noise or interference is of a comparatively low first range may be referred to as a first intensity level, and a third range that an intensity of a reception noise or interference is of a comparatively high may be referred to as a third intensity level. A second intensity level having an intensity of a reception noise or interference ranging between the first intensity level and the third intensity level may also exist. The numbers of the first range to the third range may be acquired by performing repeated measurements within the network. Additionally, the numbers of the first range to the third range may also be specified by random values. Preferably, the numbers of the first range to the third range may be acquired by performing repeated measurements, and the acquired numbers are statistically processed. Thereafter, the numbers respective to the first range to the third range may be updated at a consistent cycle period. According to the embodiment of the present invention, the number of interference levels is limited to three different levels. However, this is merely exemplary, and it will be apparent that the number of levels may increase depending upon the network condition.

The standardized first interference level to the standardized third interference level may correspond to the three types of subframes, i.e., RN subframe, contention based subframe, and unicast subframe. Therefore, even if the subframe allocation information has not been provided, the allocation structure of a subframe may be estimated based upon the interference level. More specifically, the subframe allocation information may be complemented by the standardized interference level, and the subframe allocation information may also be acquired as the interference level.

Figure 11:
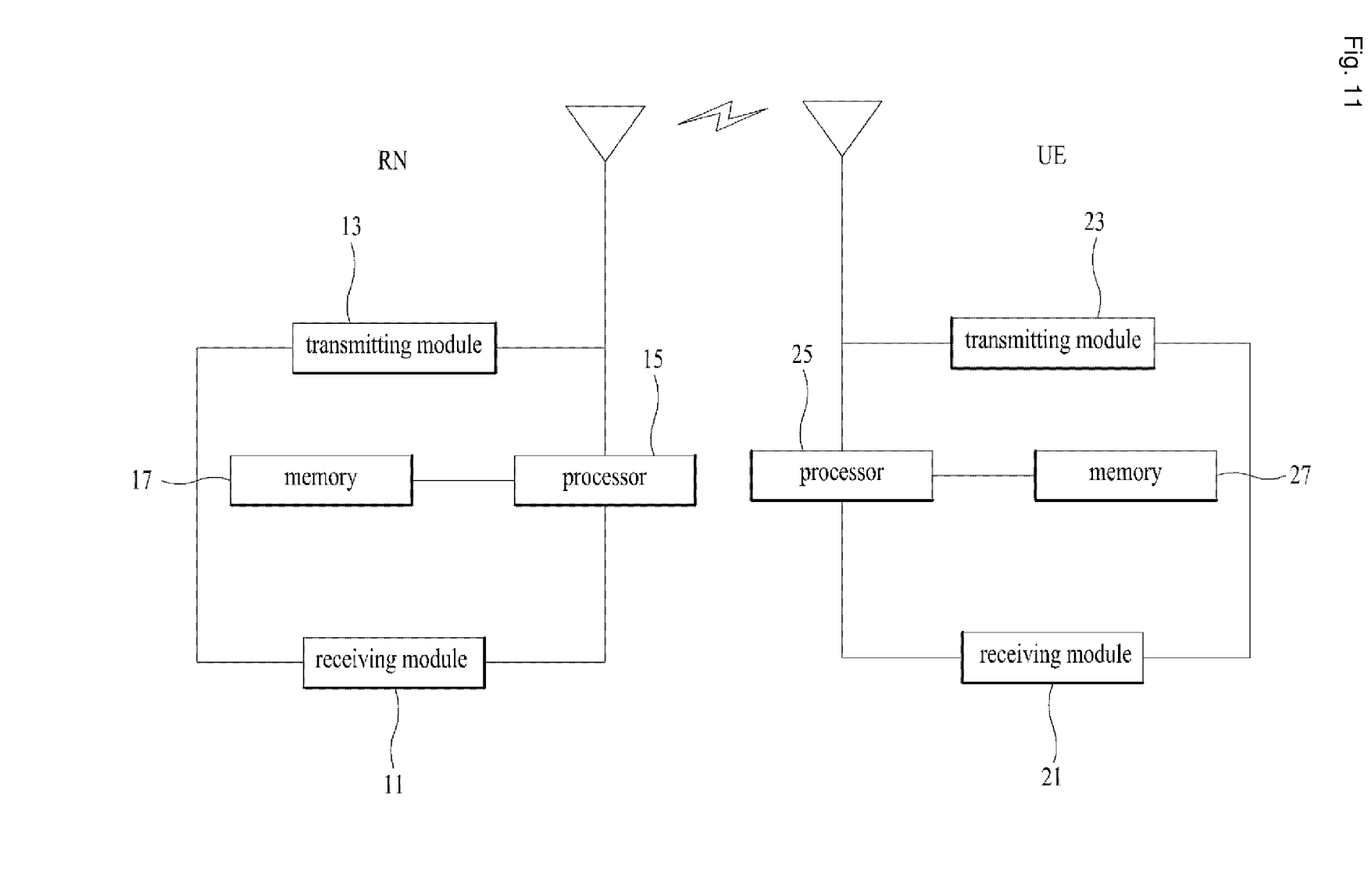
FIG. 11 illustrates structures of a relay node (RN) and an user equipment (UE) according to an embodiment of the present invention.

FIG. 11 illustrates structures of a relay node (RN) and an user equipment (UE) according to an embodiment of the present invention.

Referring to FIG. 11, the RN may include a receiving module (11), a transmitting module (13), a processor (15), and a memory (17). The processor (15) may control the receiving module (11) to receive allocation information for three types of subframes, i.e., unicast subframe, RN subframe, and contention based (CB) subframe, from a network node, such as the DeNB. The processor (15) may monitor an R-PDCCH (Relay-Physical Downlink Control Channel) that is transmitted from the DeNB on the RN subframe. When an R-PDCCH having a unique identifier of the RN (e.g., a C-RNTI (Cell-RNTI)) is detected, the processor (15) may control the receiving module (11) to receive a signal or an associated message through an R-PDSCH (Relay-Physical Downlink Shared Channel), which is indicated by control information received through the R-PDCCH. The processor (15) does not attempt to receive the R-PDCCH on the unicast subframe. If there is a signal or message that is to be transmitted to the UE, the processor (15) may control the transmitting module (13) to transmit the signal or message through a PDCCH (Physical Downlink Control Channel) and a PDSCH (Physical Downlink Shared Channel) on the unicast subframe. During the contention based subframe, either the processor (15) may transmit signals or messages to the UE through the PDCCH and the PDSCH, depending upon its radio environment, by controlling the transmitting module (13), or the processor (15) may monitor the R-PDCCH from the DeNB. If the radio resource provided by the unicast subframes is insufficient, due to an excessive number of signals or messages that are to be transmitted to the UE, the processor (15) may use the contention based subframes as the unicast subframes so as to transmit signals or messages. Alternatively, if the radio resource provided by the unicast subframes is sufficient, due to a small number of signals or messages that are to be transmitted to the UE, the processor (15) may use the contention based subframes as the RN subframes, so as to perform the monitoring of the R-PDCCH. More specifically, the processor (15) may use the contention based subframes and the RN subframes. Then, in an exceptional situation, such as when a transmission of signals or messages to the UE is urgently required to be performed, the contention based subframes may be used as the unicast subframes. Meanwhile, when the processor (15) transmits signals or messages to the UE on a contention based subframe, the processor (15) does not perform the monitoring of the PDCCH from the DeNB. The memory (17) is configured to temporarily store operated information, the received signals, data, information, and so on. Herein, the memory (17) may be replaced with another element such as a buffer (not shown).

The UE may include a receiving module (21), a transmitting module (23), a processor (25), and a memory (27). The receiving module (21) is configured to receive various signals, data, information, and so on, from the RN or the DeNB. The transmitting module (23) is configured to transmit various signals, data, information, and so on, to the RN or the DeNB. The memory (27) is configured to temporarily store operated information, the received signals, data, information, and so on. Herein, the memory (27) may be replaced with another element such as a buffer (not shown). The processor (25) may control the receiving module (21) to receive allocation information of three types of subframes, i.e., unicast subframe, RN subframe, and contention based (CB) subframe, from a network node, such as the DeNB or the RN. Also, the processor (25) may monitor a PDCCH that is transmitted from the RN on the unicast subframe and the contention based subframe. And, on the RN subframe, the processor (25) may stop the monitoring of the PDCCH.

The embodiments described above correspond to predetermined combinations of elements and features and characteristics of the present invention. Moreover, unless mentioned otherwise, the characteristics of the present invention should be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in another embodiment of the present invention, or part of the configuration or characteristics of any one embodiment of the present invention may replace the respective configuration or characteristics of another embodiment of the present invention. Furthermore, claims that do not have any explicit citations within the scope of the claims of the present invention may either be combined to configure another embodiment of the present invention, or new claims may be added during the amendment of the present invention after the filing for the patent application of the present invention.

In the description of the present invention, the embodiments of the present invention will be described by mainly focusing on the transmission and reception relation of signals or messages between the UE, the RN, and the DeNB. Herein, the specific operations that are described to be performed by the DeNB may occasionally be performed by an upper node. More specifically, it will be apparent that, in a network being configured of multiple network nodes including the DeNB, diverse operations that are performed for the communication with the UE may be performed by the DeNB or network nodes (e.g., relay nodes) other than the DeNB.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory and driven by a processor. Herein, the memory may be located inside or outside of the processor, and the memory may transmit and receive data to and from the processor by using a wide range of methods that have already been disclosed.

The present invention may be realized in another concrete configuration without deviating from the characteristics of the present invention. Therefore, it will be apparent to anyone skilled in the art that, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

Although the description of the above-described embodiments of the present invention is focused mainly on a 3GPP LTE based wireless communication system for simplicity, the present invention may used and applied in various types of wireless communications systems, by using the same method.

The invention claimed is:

1. A method of communicating with a relay node by a user equipment (UE) in a wireless communication system using three types of subframes, the method comprising:
   receiving information on the three types of subframes from the relay node;
   communicating with the relay node on a first type subframe; and
   communicating with the relay node on a second type subframe,
   wherein no communication is performed with the relay node on a third type substrate,
   wherein the second type subframe is configured for communicating with one of the donor eNB (DeNB) and the UE at the relay node,
   wherein no communication is performed with the relay node on the second type subframe if the second type subframe is used for communicating with the DeNB, and
   wherein the first type subframe is a unicast subframe, the second type subframe is a contention based subframe, and the third type subframe is a relay node (RN) subframe.

2. The method of claim 1, wherein the three types of subframes are classified by an interference level on an intensity of interference.

3. The method of claim 2, wherein the interference is caused by the transmission of signals in the DeNB, while communicating with the relay node.

4. The method of claim 3, wherein the first type subframe has a first interference level, the third type subframe has a third interference level which is different from the first interference level, and the second type subframe has a second interference level ranging between the first interference level and the third interference level.

5. The method of claim 4, wherein the first interference level has a higher intensity of interference than the third interference level.

6. A method of communicating with a user equipment (UE) by a relay node in a wireless communication system using three types of subframes, the method comprising:
   receiving information on the three types of subframes from a donor eNB (DeNB);
   communicating with the UE on a first type subframe;
   communicating with the UE on a second type subframe; and
   communicating with the DeNB on a third type subframe,
   wherein the second type subframe is configured for communicating with one of the DeNB and the UE,
   wherein no communication is performed with the UE on the second type subframe if the second type subframe is used for communicating with the DeNB,
   wherein no communication is performed with the user equipment on the third type subframe, and
   wherein the first type subframe is a unicast subframe, the second type subframe is a contention based subframe, and the third type subframe is a relay node (RN) subframe.

7. The method of claim 6, wherein a reception of signals from the DeNB is not attempted, while communicating with the UE on the second type subframe.

8. A method of communicating with a relay node by a donor eNB (DeNB) in a wireless communication system using three types of subframes, the method comprising:
   transmitting information on the three types of subframes to the relay node;
   communicating with the relay node on a second type subframe; and
   communicating with the relay node on a third type subframe,
   wherein no communication is performed with the relay node on a first type subframe,
   wherein the second type subframe is configured for communicating with one of the donor eNB (DeNB) and the UE at the relay node,
   wherein no communication is performed with the relay node on the second type subframe if the second type subframe is used for communicating with the UE, and
   wherein the first type subframe is a unicast subframe, the second type subframe is a contention based subframe, and the third type subframe is a relay node (RN) subframe.

9. The method of claim 8, wherein the three types of subframes are classified by an interference level on an intensity of interference.

10. The method of claim 9, wherein the interference is caused by the transmission of signals in the UE, while communicating with the relay node.

11. The method of claim 8, wherein the first type subframe has a first interference level, the third type subframe has a third interference level which is different from the first interference level, and the second type subframe has a second interference level ranging between the first interference level and the third interference level.

12. The method of claim 11, wherein the first interference level has a higher intensity of interference than the third interference level.

* * * * *